US009552390B2

United States Patent
Zhou

(10) Patent No.: US 9,552,390 B2
(45) Date of Patent: Jan. 24, 2017

(54) SYSTEM AND METHOD FOR OUT OF ORDER MULTIPLE QUERY EXECUTION WITHIN STORED PROCEDURE

(71) Applicant: Futurewei Technologies, Inc., Plano, TX (US)

(72) Inventor: Qingqing Zhou, Santa Clara, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 248 days.

(21) Appl. No.: 14/264,851

(22) Filed: Apr. 29, 2014

(65) Prior Publication Data

US 2015/0310065 A1    Oct. 29, 2015

(51) Int. Cl.
    *G06F 17/30*    (2006.01)
(52) U.S. Cl.
    CPC ... *G06F 17/30463* (2013.01); *G06F 17/30339* (2013.01)
(58) Field of Classification Search
    None
    See application file for complete search history.

(56) References Cited

U.S. PATENT DOCUMENTS

| 2001/0013030 | A1* | 8/2001 | Colby | G06F 17/30312 |
| 2005/0187977 | A1 | 8/2005 | Frost | |
| 2010/0082646 | A1* | 4/2010 | Meek | G06F 17/3056 707/752 |

FOREIGN PATENT DOCUMENTS

CN    102662946 A    9/2012

OTHER PUBLICATIONS

International Search Report received in Application No. PCT/CN2015/077717, mailed Jul. 30, 2015, 11 pages.

* cited by examiner

*Primary Examiner* — Syed Hasan
(74) *Attorney, Agent, or Firm* — Futurewei Technologies, Inc.

(57) ABSTRACT

Embodiments are provided herein for efficient out-of-order (OOO) multiple query execution within a stored procedure in a database processing system. An embodiment method includes compiling a procedure comprising a plurality of statements. During the compiling, any dependencies between the statements are detected and maintained in a dependency table. The method further includes executing the procedure. During the execution, the method includes upon detecting a change in a dependency between the statements, updating the dependency in the dependency table. The statements are scheduled for OOO execution according to the dependency table with the updated dependencies.

17 Claims, 3 Drawing Sheets

SYSTEM AND METHOD FOR OUT OF ORDER MULTIPLE QUERY EXECUTION WITHIN STORED PROCEDURE

TECHNICAL FIELD

The present invention relates to database query processing, and, in particular embodiments, to a system and method for out of order multiple query execution within stored procedure.

BACKGROUND

In database systems, a stored procedure consists of multiple Structured Query Language (SQL) statements (also referred to herein as queries) to compute a result. The procedures may include sequential execution, branches, loops and invocations to other stored procedures. When the stored procedure is written, developers assume the sequential execution model to get the correct result. However, in some cases, these statements can be scheduled to run in parallel to achieve the best response time. Multiple commercial databases support intra-parallel query, which enables a query to run in multiple smaller pieces in parallel to utilize more resources (e.g., processing cores, memory). This will help in some cases with traditional serial execution schemes. However, some scenarios can benefit from out-of-order (OOO) multiple query execution, where queries or statements are executed out of order or sequence in the procedure. An efficient method to schedule OOO multiple queries within a stored procedure is beneficial, e. g., to achieve improved response time and/or better use resources.

SUMMARY OF THE INVENTION

In accordance with an embodiment, a method for out-of-order (OOO) multiple query execution by a database processing system includes compiling a procedure comprising a plurality of statements. During the compiling, the method includes detecting dependencies between the statements, and maintaining the dependencies of the statements in a dependency table. The method further includes executing the procedure. During the executing, the method includes upon detecting a change in a dependency between the statements, updating the dependency in the dependency table, and scheduling the statements for OOO execution according to the dependency table.

In accordance with another embodiment, a method for OOO multiple query execution by a database processing system includes creating a table of dependency analysis. During compilation of a procedure, the method includes detecting statement dependencies in a query tree comprising a plurality of statements, and inserting, in the table, dependency information for the statements according to the statement dependencies. During execution of the procedure, the method includes determining, for each statement, whether to perform OOO execution of a second statement according to dependency information for the statement in the table. During execution of each statement, the method includes updating in the table the dependency information for the statement and for each other statement dependent on the statement.

In accordance with yet another embodiment, a processing component of a database system supporting OOO multiple query execution comprises at least one processor and a non-transitory computer readable storage medium storing programming for execution by the at least one processor. The programming includes instructions to compile a procedure comprising a plurality of statements, and during the compiling to detect dependencies between the statements and maintain the dependencies of the statements in a dependency table. The programming includes further instructions to execute the procedure, and to update a dependency between the statements in the dependency table upon detecting a change in the dependency during the execution. The programming further includes instructions to schedule the statements for OOO execution according to the dependency table.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
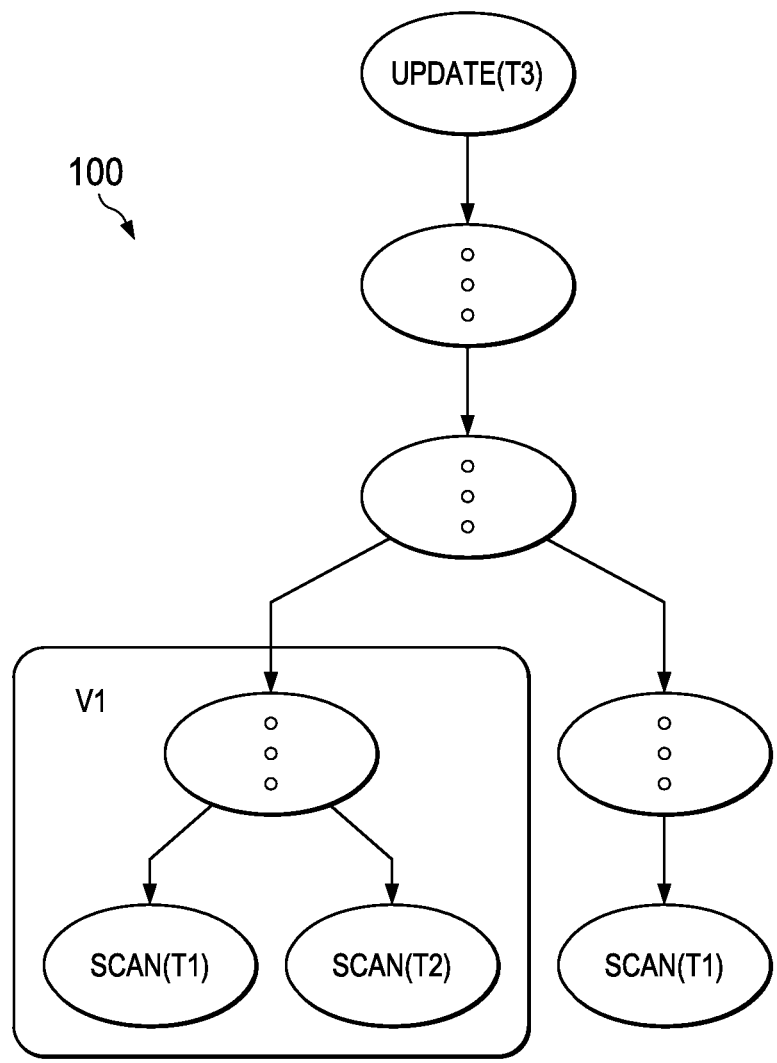
FIG. 1 illustrates an example of a query tree for a stored procedure.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Some scenarios require or benefit from out-of-order (OOO) multiple query execution. For example, an intra-parallel query may have skewed intermediate resource usage due to data skew, which leaves resources unused or available at some time periods during execution. In the sequential model, the next statements have to wait for completion of previous statements. However, using OOO execution allows the next statements to use the available resources without waiting. In a scenario with multiple cores integrated within a central processing unit (CPU), a middle sized query can achieve better CPU efficiency with certain degree of parallelism that may not include all processing cores. This leaves some cores available. With OOO execution, the available cores can be used to execute other statements than the current query and hence improve the overall efficiency. In another scenario, the resource manager monitors the system and may delay a query due to current resource usage. However, if the manager is allowed to peek at the next statements of the current stored procedure, the monitor can schedule some of the statements to fully utilize the resources. The scheduling can further allow the sharing of resources, such as a buffer pool.

Embodiments are provided herein for efficient OOO multiple query execution within a stored procedure. The embodiments include a system framework and method to schedule the OOO multiple queries and achieve a better response time for executing the stored procedure (SP) statements. The terms query and statement are used herein interchangeably to refer to a single instruction in the SP. When a SP is compiled, the read set (RS) and write set (WS) objects in each statement are parsed and analyzed for dependencies. The results of the analysis are maintained in a system table. In the case of data definition languages (DDLs) that change database dependencies, the SP can be recompiled. When the SP is run or executed (after the compilation step), the RS/WS object dependencies are retrieved and further modified if needed. Any statements without dependencies can then be schedule to run in any order, e.g., if the cost estimation for executing the statements suggests that OOO execution is beneficial.

The database system is equipped with a plurality of components to enable the scheduling of OOO multiple queries within a stored procedure. The components include a compiler capable to compile the SP and identify the RS and WS objects in the stored procedure. The system is equipped with a system table for tracking database object dependencies, and a query scheduler capable of scheduling OOO queries. The system's compiler is configured to parse the SP and identify the RS/WS objects to enable the dependency analysis. During the compilation step, the system table for tracking database object dependencies is used to identify the objects referenced in the RS/WS, as described below. Subsequently, during run time or execution, a query scheduler performs another round of run-time dependency check and schedules the OOO queries (for resource usage) accordingly.

To analyze data dependency, a plurality of features are analyzed in the stored procedure statements (or queries), including the RS/WS objects, database object granularity, implied database dependencies, and query granularity. The RS object is identified as any object that the query needs to read. The WS object is identified as any object that the query will update. There are two categories of RS/WS objects: the program objects and the database objects. Typically, the program objects can be identified and treated by the programming language. The database objects can be more complex and may cause wrong dependency results if they are checked literally (according to syntax only).

For example, Table 1 shows two statements, S1 and S2, with corresponding RS and WS. According to a literal (syntax) interpretation, T1 and V1 are different objects, thus S1 and S2 may be independent and can be scheduled as such. However, if V1 is actually a materialized view of T1, then S2 depends on S1. A system table is maintained in the system to track the object dependencies for SP recompiling purpose. The system table information can be relied on to determine the actual dependencies of RS/WS objects of S1 and S2.

TABLE 1

Example of statements with corresponding RS/WS

| Statement | Read Set | Write Set |
|---|---|---|
| S1 | @i, V1 | V1 |
| S2 | @j | T1 |

FIG. 1 shows an example of a query tree 100 for a stored procedure. The query tree 100 comprises multiple SQL statements (or queries) including:
UPDATE T3 . . . WHERE c=(SELECT COUNT(*) FROM V1 JOIN T1 ON . . . );
In the above, the view V1 is decomposed to objects T1 and T2. The WS={T3} and RS={T1, T2}. For WS identification, the UPDATE target is added to the WS.

Unlike other data, the database object can have granularity. For example, Table 2 shows two statements, S1 and S2 with object granularities. Though S1 and S2 have dependency over table T1, the two statements are actually referencing different ranges. Hence, S1 and S2 can be independently scheduled. Since the SP may get arguments as user input, a runtime check is used to verify dependencies that are not present at compile time but occur during runtime.

TABLE 2

Example of statements with object granularities

| Statement | Read Set | Write Set |
|---|---|---|
| S1 | @i, V1(c > 1) | V1 |
| S2 | @j | T1(c < 1) |

As an example for implied database dependencies, the following statements are considered:
S1: UPDATE tbl SET i=1 WHERE i=2;
S2: GET DIAGNOSTICS var=ROW_COUNT;
In the above, there is no dependency according to literal (syntax) analysis between the two statements. However, according to the results of executing S1, the statement S2 is affected. Hence, S2 is actually dependent on S1. There are also commands that can change the random seeds, locale behavior, or other commands which cause changes of behavior in subsequent statements. Such commands, e.g., UTILITY commands, can be treated as barrier, where no queries can be scheduled across them (before they are completed).

Considering query execution support for intra-query parallelism, a query may actually consist of several smaller queries, according to the query granularity. As such, the parallel segments of the query can be each treated as a complete query and analyzed for dependencies accordingly, as described above. For example, Table 3 shows two statements, S1 and S2 with query granularities.

TABLE 3

Example of statements with query granularities

| Statement | Read Set | Write Set |
|---|---|---|
| S1 | @i, T1 | T1 |
| S2 | @j | T1, T2 |

In table 3, S2 depends on T1 in S1. Since S2 is a join command between T1 and T2, a query optimizer can parallelize S2 as:
-- HashJoin --- repartition—T1
|----- repartition—T2 (build side)

This parallelization can change the dependency as shown in Table 4.

TABLE 4

Statements of Table 3 after parallelization of S2

| Statement | Read Set | Write Set |
| --- | --- | --- |
| S1 | @i, T1 | T1 |
| S2_1 | @j | S2_2, S2_3 |
| S2_2 | T2 | — |
| S2_3 | T1 | — |

In the above, S2_2 becomes free to run before S1, but S2_3 is blocked from running until S1 is completed. This does not introduce further complexity to the query optimizer, which is capable of intra-query parallelism.

The algorithm to recognize dependencies comprises two parts: a compile time part and runtime part. The runtime part is used to validate the arguments and finalize any uncertain dependencies from the compile time operation. The following is an example of the algorithm for data dependency analysis:

```
DataDependencyAnalysis (SP @sp)
   /* create dependency table */
   For each statement, parse tree @s in @sp analysis dependency:
      Create an entry (statement, RS{ }, WS{ }, DependOn{ }) in
   dependency table
      If @s is a UTILITY command
         Insert a barrier protecting current segment
      Else
         /* note leaf node already have view rewritten down to the
   base relations */
         Insert leaf nodes, arguments to RS{ } and destination node
   (including triggers) to WS{ }
   /* analysis dependency never across barriers */
   For each barrier protected segments
      For each pair (i, j), i<j, within this segment
         Add i to j's DependOn{ } if (WS(j) ∩ RS(i))∪(WS(i) ∩
   RS(j)) ∪ (WS(i) ∩ WS(j)) != ∅
   /* persist results */
   Mark the ones with arguments DependOn{ } = uncertain for runtime
      analysis
Persist the results together with @sp in a system table
```

Since the dependencies analysis relies on database objects, if any of the objects change during compilation time, the query or statement is recompiled and the dependencies are recalculated. If the data of the database objects change, the compiling may or may not be needed depending on the granularity of the dependency, as descried above.

When there is no data dependency between S1 and S2, running the statements using OOO is optional and may be up to the resource governor (or scheduler). In this case, no extra logic is needed and the resource governor can simply treat S1 and S2 as new arrival queries. Resolving the branching dependency can then be delayed to query run time.

The following query is an example for handling query branching:

```
@i = SELECT COUNT(*) FROM T WHERE i > 9;   --S1
IF (@i > 1000)
      @j = SELECT ...;                     -- S2
ELSE
      @k= SELECT ...;                      -- S3
```

For the query branching above, the query optimizer sets the probability @p of '@i>1000'. During the execution, the query controller can monitor the execution of S1 and adjust @p accordingly to decide whether to invoke S2 or S3. The Loop implementation can also be treated as a special case of branching.

Figure 2:
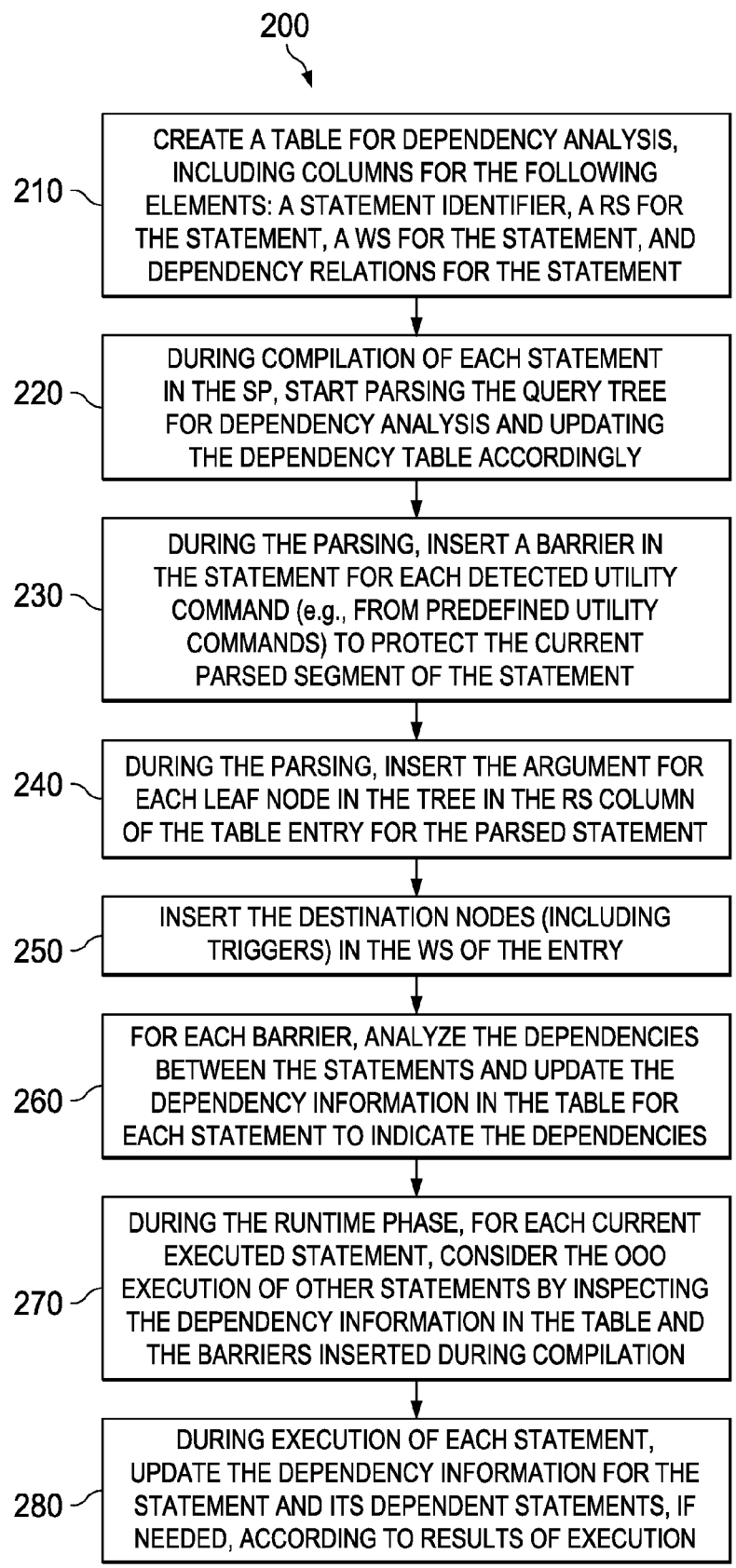
FIG. 2 illustrates an embodiment method for scheduling out-of-order multiple queries within a stored procedure.

FIG. 2 shows an embodiment method 200, e.g., by a database processing system, for scheduling OOO multiple queries within a stored procedure. At step 210, a table for dependency analysis is created. The table includes the columns for the following elements: a statement identifier, a RS for the statement, a WS for the statement, and dependency relations for the statement. At step 220, during compilation of each statement in the SP, the method starts parsing the query tree for dependency analysis and updating the dependency table accordingly. This step can include determining a cost of executing each statement and if the cost exceeds a predefined threshold (e.g., execution time, memory usage), then performing the dependency analysis on the considered statement. Otherwise, the dependency analysis for the considered statement can be skipped. At step 230, during the parsing, a barrier is inserted in the statement for each detected UTILITY command (e.g., from predefined UTILITY commands) to protect the current parsed segment of the statement. At step 240, during the parsing, the argument for each leaf node in the tree is inserted in the RS column of the table entry for the parsed statement. At step 250, the destination nodes (including triggers) are inserted in the WS of the entry. At step 260, for each barrier, the dependencies between the statements are analyzed (as described in the embodiments above) and the dependency information in the table for each statement is updated to indicate the dependencies. The dependencies are considered at the compilation stage to be tentative, e.g., subject to change in the runtime phase. At step 270, during the runtime or execution phase, for each current executed statement, the resource scheduler considers the OOO execution of other statements by inspecting the dependency information in the table and the barriers inserted during compilation. The step can include comparing a cost (e.g., delay, memory usage) for executing a statement before completing the execution of a preceding statement in the order of the procedure. Upon determining a benefit (e.g., saving execution time) for OOO execution of the second statement according to the cost, executing the second statement before completing the execution of the preceding statement. At step 280, during execution of each statement, the system updates the dependency information for the statement and its dependent statements if needed according to results of execution.

Figure 3:
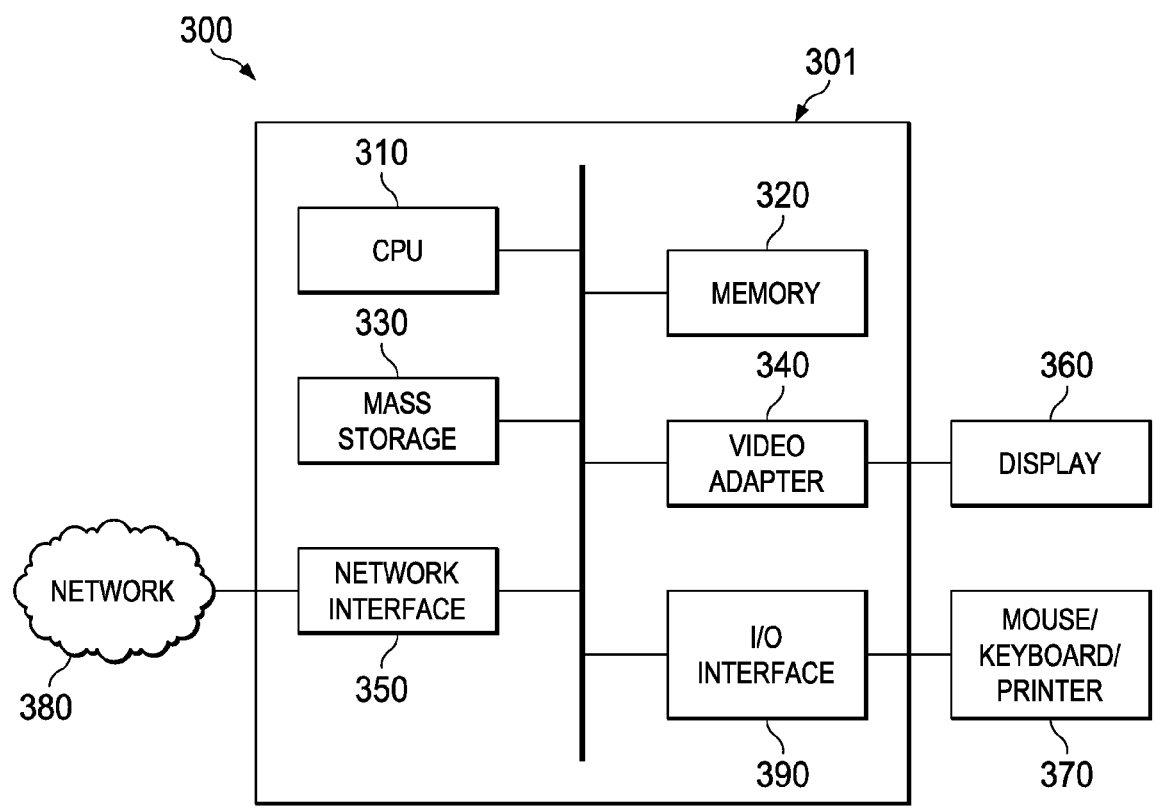
FIG. 3 is a diagram of a processing system that can be used to implement various embodiments.

FIG. 3 is a block diagram of a processing system 300 that may be used for implementing the embodiments and methods disclosed herein. For example the processing system 300 can be a database processing system or part of such system, e.g., a server. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 300 may comprise a processing unit 301 equipped with one or more input/output devices, such as a speaker, microphone, mouse, touchscreen, keypad, keyboard, printer, display, and the like. The processing unit 301 may include a central processing unit (CPU) 310, memory 320, a mass storage device 330, a video adapter 340, and an I/O interface 390 connected to a bus.

The bus may be one or more of any type of several bus architectures including a memory bus or memory controller, a peripheral bus, video bus, or the like. The CPU 310 may comprise any type of electronic data processor. The memory 320 may comprise any type of system memory such as static random access memory (SRAM), dynamic random access memory (DRAM), synchronous DRAM (SDRAM), read-only memory (ROM), a combination thereof, or the like. In an embodiment, the memory 320 may include ROM for use at boot-up, and DRAM for program and data storage for use while executing programs.

The mass storage device 330 may comprise any type of storage device configured to store data, programs, and other information and to make the data, programs, and other information accessible via the bus. The mass storage device 330 may comprise, for example, one or more of a solid state drive, hard disk drive, a magnetic disk drive, an optical disk drive, or the like.

The video adapter 340 and the I/O interface 390 provide interfaces to couple external input and output devices to the processing unit 301. As illustrated, examples of input and output devices include a display 360 coupled to the video adapter 340 and a combination of mouse/keyboard/printer 370 coupled to the I/O interface 390. Other devices may be coupled to the processing unit 301, and additional or fewer interface cards may be utilized. For example, a serial interface such as Universal Serial Bus (USB) (not shown) may be used to provide an interface for a printer.

The processing unit 301 also includes one or more network interfaces 350, which may comprise wired links, such as an Ethernet cable or the like, and/or wireless links to access nodes or one or more networks 380. The network interface 350 allows the processing unit 301 to communicate with remote units via the networks 380. For example, the network interface 350 may provide wireless communication via one or more transmitters/transmit antennas and one or more receivers/receive antennas. In an embodiment, the processing unit 301 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for out-of-order (OOO) multiple query execution by a database processing system, the method comprising:
   compiling a stored procedure comprising a plurality of statements;
   during the compiling, detecting dependencies between the statements, with detecting dependencies between the statements comprising:
      adding each read object of a statement to a read set;
      adding each write object of the statement to a write set; and
      inserting the read set and the write set to a corresponding entry in a dependency table;
   maintaining the dependencies of the statements in the dependency table;
   executing the stored procedure;
   during the executing, upon detecting a change in a dependency between the statements, updating the dependency in the dependency table; and
   scheduling the statements for OOO execution according to the dependency table.

2. The method of claim 1, wherein scheduling the statements for OOO execution according to the dependency table comprises scheduling a second statement for execution without waiting for completing an execution of a first statement, and wherein the second statement is subsequent to the first statement in the stored procedure and independent from the first statement according to the dependency table.

3. The method of claim 2, wherein scheduling the second statement for execution further includes:
   comparing a cost for executing the second statement before completing the execution of the first statement; and
   upon determining a benefit for OOO execution of the second statement according to the cost, executing the second statement before completing the execution of the first statement.

4. The method of claim 1, wherein detecting the dependencies between the statements includes:
   during the compiling, determining a cost of executing each statement of the statements; and
   upon determining that the cost for the statement exceeds a predefined threshold, performing a dependency analysis for the statement.

5. The method of claim 1, wherein detecting the dependencies between the statements includes detecting whether executing a first statement affects execution of a second statement subsequent to the first statement in the stored procedure.

6. The method of claim 1 further comprising:
   during the compiling, separating a query in the stored procedure into a plurality of query segments;
   detecting dependencies between the query segments;
   maintaining the dependencies of the query segments in the dependency table;
   during the executing, upon detecting a change in a dependency of the query segments, updating the dependency in the dependency table; and
   scheduling the query segments for OOO execution according to the dependency table.

7. The method of claim 1, wherein detecting the dependencies between the statements includes identifying in the statements each read object, write object, object granularity, implied database dependency according to results of executing the statements, and query granularity.

8. A method for out-of-order (OOO) multiple query execution by a database processing system, the method comprising:
   creating a dependency table, wherein the dependency table includes an entry for each statement comprising an identifier, a read set, and a write set;

during compilation of a stored procedure, detecting statement dependencies in a query tree comprising a plurality of statements, wherein the statement dependencies are detected according to the read set and the write set;

inserting, in the dependency table, dependency information for the statements according to the statement dependencies;

during execution of the stored procedure, determining, for each statement, whether to perform OOO execution of a second statement according to dependency information for the statement in the dependency table; and during execution of each statement, updating in the dependency table the dependency information for the statement and for each other statement dependent on the statement.

9. The method for claim 8, wherein determining, for each statement, whether to perform OOO execution of the second statement includes scheduling the second statement for execution without waiting for completing execution of the statement upon detecting in the dependency table that the second statement is independent of the statement.

10. The method of claim 9, wherein the second statement is subsequent to the statement in the query tree.

11. The method of claim 8, further comprising:
inserting an argument for each leaf node statement of the query tree in the read set of the entry corresponding to the leaf node statement in the dependency table; and
inserting each destination node for the leaf node, including each trigger, in the write set of the entry.

12. The method of claim 8 further comprising during the compilation, inserting a barrier marking a corresponding segment of the query tree upon detecting a utility command.

13. The method of claim 12, wherein during the execution of the stored procedure, for each statement, the OOO execution of the second statement is determined according to the dependency information for the statement in the dependency table without scheduling statements for execution across the barrier.

14. A processing component of a database system supporting out-of-order (OOO) multiple query execution, the processing component comprising:

at least one processor; and
a non-transitory computer readable storage medium in communication with the at least one processor and storing programming for execution by the at least one processor, the programming including instructions to:
compile a stored procedure comprising a plurality of statements;
during compiling the stored procedure, detect dependencies between the statements, with detecting dependencies of the statements comprising:
adding each read object of a statement to a read set;
adding each write object of the statement to a write set; and
inserting the read set and the write set to a corresponding entry in a dependency table;
maintain the dependencies of the statements in the dependency table;
execute the stored procedure;
during executing the stored procedure, upon detecting a change in a dependency between the statements, update the dependency in the dependency table; and
schedule the statements for OOO execution according to the dependency table.

15. The processing component of claim 14, wherein the instructions to schedule the statements for OOO execution according to the dependency table comprises instructions to schedule a second statement independent of a first statement for execution without waiting for completing an execution of the first statement.

16. The processing component of claim 15, wherein the second statement is subsequent to the first statement in the stored procedure and independent from the first statement according to the dependency table.

17. The processing component of claim 14, wherein the instructions to detect the dependencies between the statements include instruction to:
during compiling the stored procedure, determine a cost of executing each statement of the statements; and
upon determining that the cost for the statement exceeds a predefined threshold, perform a dependency analysis for the statement.

* * * * *